Patented May 10, 1932

1,857,498

UNITED STATES PATENT OFFICE

ALBERT L. CLAPP, OF DANVERS, MASSACHUSETTS

TREATMENT OF PULP ARTICLES AND MATERIAL THEREFOR

No Drawing.     Application filed September 27, 1923.   Serial No. 308,881.

This invention relates to the treatment of fibrous articles such as those made from cellulose pulp, and has for its object to improve the characteristics of articles such as bottles, dishes, toys, and flower pots, especially when moulded from the pulp.

In moulding articles from cellulose pulp, it is found that the article is likely to be weak and susceptible to damage even after drying, particularly when a free pulp stock—for instance ground-wood pulp—is employed as a raw material. Some moulding processes require the use of a free pulp containing little, if any, sizing or filling materials, and in such cases the finished articles are likely to be quite flexible and weak, so that considerable loss is sustained through damage in handling, and their useful life is quite short, especially when exposed to moisture, as under these conditions they become soft and punky, and finally disintegrate.

I have found that such articles may be treated with a composition capable of penetrating the pores and interstices of the article, and that such a composition, especially when containing ingredients which will react while in the article, may impart thereto desirable qualities which are lacking in the untreated articles. Thus, a liquid containing in suspension therein fine particles with which certain ingredients of the liquid may react, may be used, the liquid carrying the particles into the pores and interstices, where the reaction between them may take place, whereupon the articles may be allowed to set. For example, if such articles are treated with a composition comprising a solution of sodium silicate containing fine particles of infusorial earth or cellite in suspension, and then dried, they are hardened and strengthened considerably, and are rendered much more water-resistant. Apparently, the infusorial earth, which is capable of taking up four times its weight in water passes into the pores and interstices of the articles along with the sodium silicate, the sodium silicate thus being absorbed not only by the pulp fibers but also by the fine particles of infusorial earth which fill the pores and interstices of the article, so that when the articles is dried or set, it is much stiffer, stronger, and far more resistant to the action of moisture than before. A further advantage of using a composition of this character is that metallic oxide pigments, such as ferric oxide, chrome oxide, nickel oxide, zinc oxide, and the like may be incorporated into the composition if a colored product is desired, and the pigment firmly fixed to the fibers of the articles, sodium silicate apparently reacting with the oxide to form a silicate, particularly when the articles are dried at elevated temperatures, say, 200° to 300° F., which temperatures are insufficiently high to decompose or char the cellulose pulp of which the articles are composed. When articles so pigmented are soaked in water, it is found that the pigment is not washed out, even after days of immersion, indicating that a substantially permanent fixation of the pigment on the fibers has been effected. Apparently, also, there is some slow reaction between the sodium silicate and the kieselguhr.

In practising the treatment of the present invention, it is preferable to use moulded articles which are free from sizing materials so as to permit rapid and uniform impregnation of the articles with the composition. Compositions made up of various strengths of sodium silicate solution and containing various amounts of kieselguhr and/or pigment may be used, one satisfactory composition, for example, being made of 10° to 15° Baumé sodium silicate containing about 1% kieselguhr and about 2% pigment uniformly suspended therein. The sodium silicate employed as a raw material is preferably one containing a comparatively low free $Na_2O$ content and a high free $SiO_2$ content, as this material apparently sets more rapidly to give a more waterproof product than when sodium silicate of high free $Na_2O$ content and low free $SiO_2$ content is used. The moulded pulp articles when dipped into the composition is readily impregnated throughout, and when subsequently dried or set, say at 200° to 300° F., are stiff and sufficiently strong to withstand shocks without breaking. They are also sufficiently water-resistant to withstand a long period of immersion in water without disintegrating.

While the example given deals with a composition in which kieselguhr is present to increase the stiffness, strength, and water resistance of the product, the articles may be treated to less advantage with sodium silicate containing only the pigment in suspension. It is necessary, however, that the article be treated with the kieselguhr and/or pigment in suspension in the sodium silicate solution, for under these conditions the materials in finely divided condition are carried into the pores and interstices of the article, the pigment being fixed while setting of the composition takes place. The same results cannot be obtained by first treating the articles with sodium silicate solution, and then treating with an aqueous suspension of the kieselguhr and/or the pigment, or vice versa, as in such case the suspended particles are not carried into the articles as satisfactorily, and the water of the suspension tends to dilute the water of the sodium silicate solution.

Having thus described a certain embodiment of this invention, it should be evident to those skilled in the art that various changes and modifications might be made therein without departing from the spirit or scope of invention as defined by the appended claims.

I claim:

1. A method which comprises impregnating throughout pre-moulded cellulose pulp articles with a sodium silicate solution containing kieselguhr in suspension therein, and heat-drying the articles at temperatures insufficiently high to decompose the pulp.

2. A method which comprises impregnating throughout pre-moulded cellulose pulp articles with a sodium silicate solution containing a metallic oxide pigment in suspension therein, and heat-drying the articles at temperatures insufficiently high to decompose the pulp.

3. A method which comprises inpregnating throughout pre-moulded cellulose pulp articles with a sodium silicate solution containing kieselguhr and a metallic oxide pigment in suspension therein, and heat-drying the articles at temperatures insufficiently high to decompose the pulp.

4. A method which comprises impregnating throughout pre-moulded cellulose pulp articles with a sodium silicate solution containing kieselguhr and a metallic oxide pigment in suspension therein, and drying the articles at about 200° to 300° F.

5. A pre-moulded pulp article the pores and interstices throughout which are filled with the reaction product of kieselguhr and sodium silicate.

6. A pre-moulded pulp article impregnated substantially throughout with the reaction product of a metallic oxide pigment and sodium silicate.

7. A pre-moulded pulp article the pores and interstices throughout which are filled with the reaction product of kieselguhr, a metallic oxide pigment, and sodium silicate.

In testimony whereof I have affixed my signature.

ALBERT L. CLAPP.